Oct. 23, 1962     W. E. BOTTENBERG     3,059,398
WINDROWER ATTACHMENT FOR ROTARY MOWER
Filed Nov. 16, 1959     2 Sheets-Sheet 1
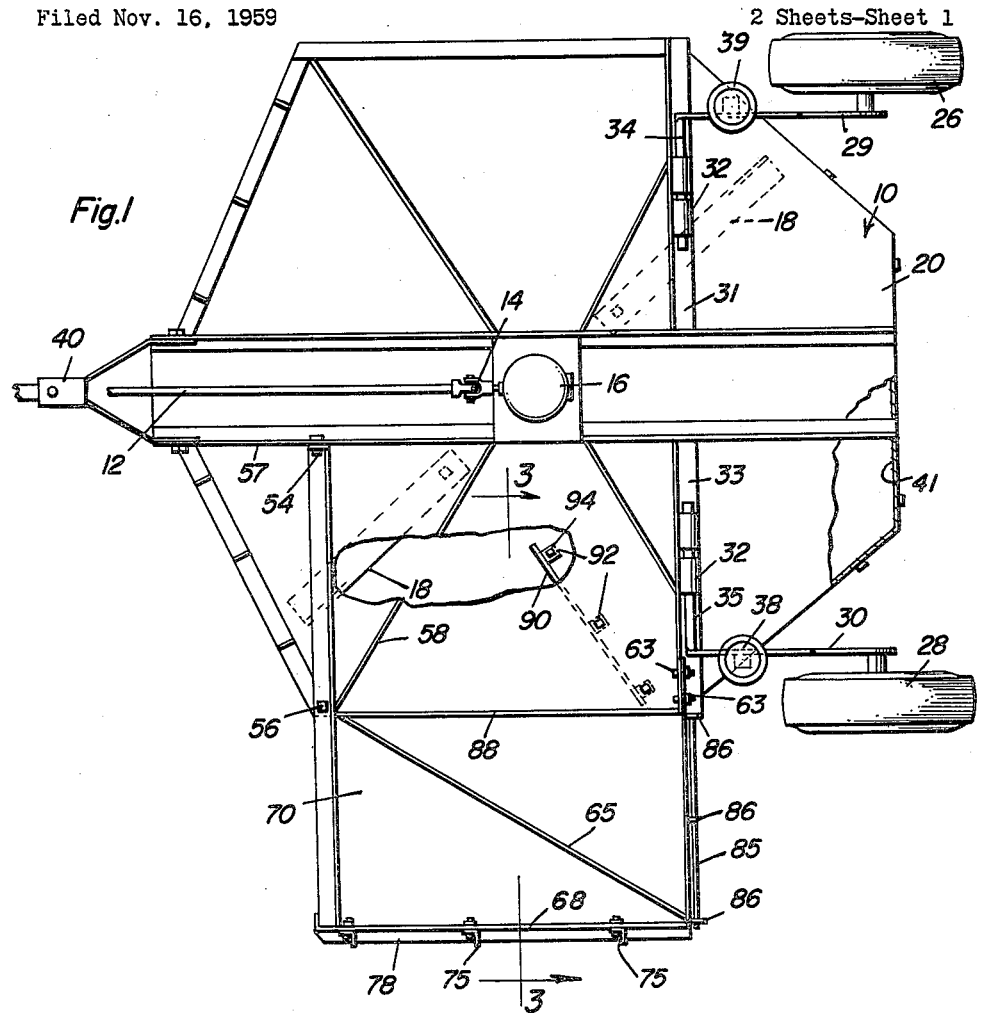
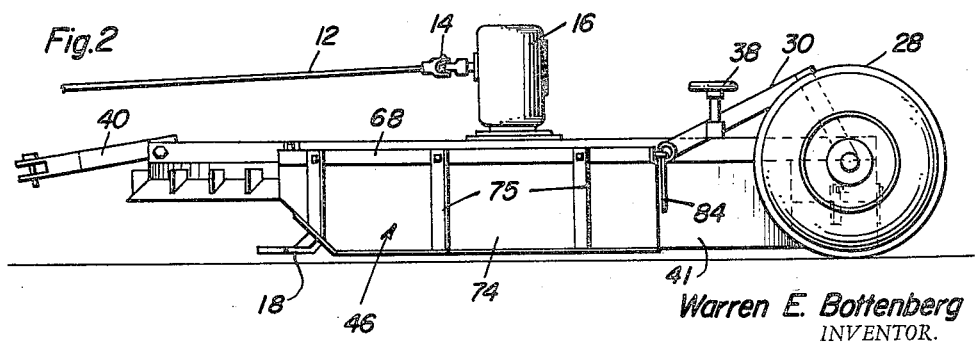
Warren E. Bottenberg
INVENTOR.

Oct. 23, 1962 W. E. BOTTENBERG 3,059,398
WINDROWER ATTACHMENT FOR ROTARY MOWER
Filed Nov. 16, 1959 2 Sheets-Sheet 2
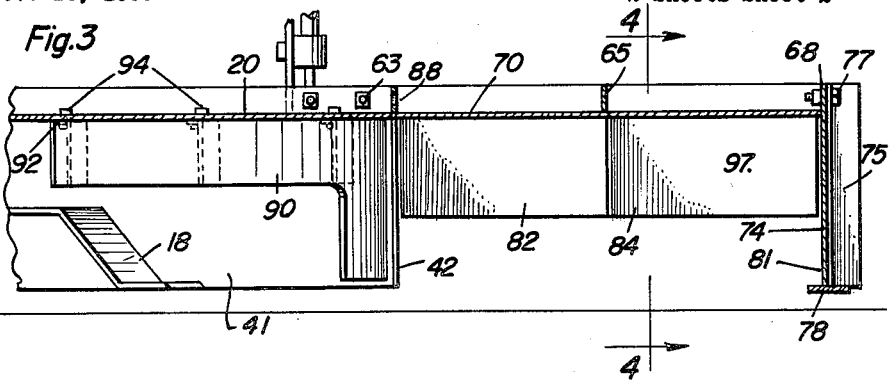
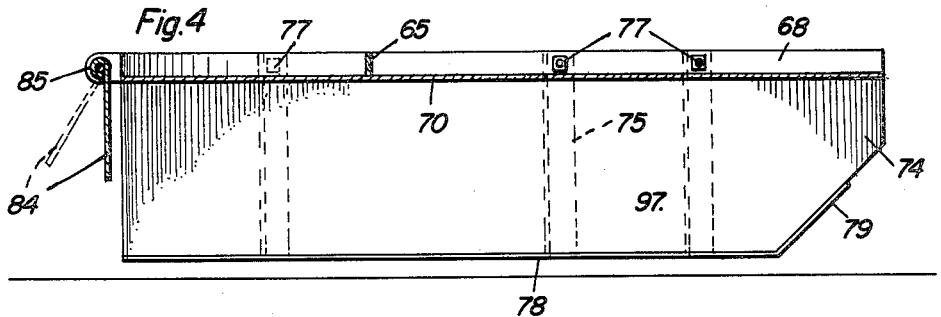
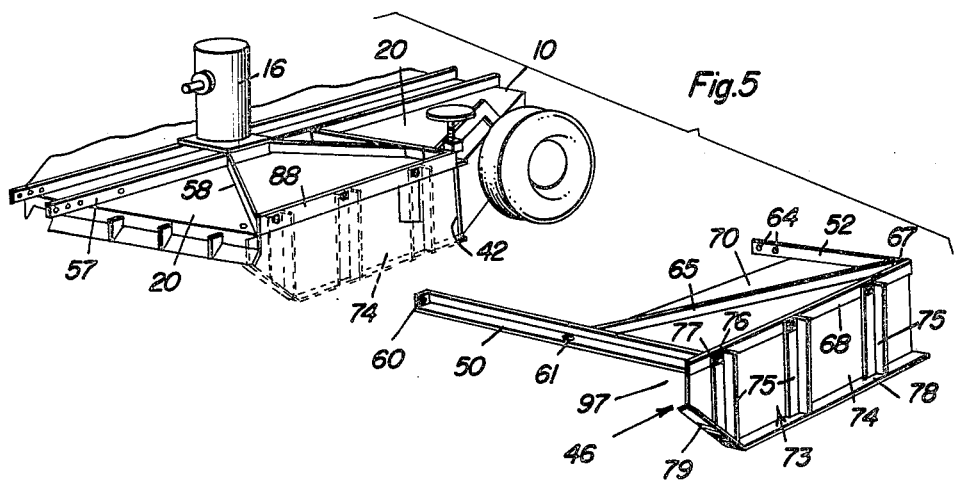
Warren E. Bottenberg
INVENTOR.

3,059,398
WINDROWER ATTACHMENT FOR ROTARY
MOWER
Warren E. Bottenberg, Holton, Kans., assignor to B-M-B
Company, Inc., a corporation of Kansas
Filed Nov. 16, 1959, Ser. No. 853,237
3 Claims. (Cl. 56—25.4)

The present invention relates to an attachment for a rotary mower, to convert the mower into a combined machine capable of mowing and windrowing.

An object of the invention is to provide an attachment for a rotary mower, which windrows the cut material as the mower is operated in the usual way.

The invention provides a method for mowing, crushing and windrowing hay and other growth material with one machine and with only a single pass over the field.

A very important advantage of the invention is that a crop which is cut and windrowed at the same time or essentially at the same time retains more protein and vitamin A.

The reasons are that:

(1) The cut material is immediately forced out of the rotary mower whereby it is not recut numerous times or shredded as would normally occur; since the leaves contain most of the protein it is important that they are not recut or shredded.

(2) The cut material is caught and deposited in a windrow so that it is not necessary to rake or molest the cut material while it is curing; raking of the cut material will cause a loss of valuable leaves.

(3) The windrow as made with this attachment is comparatively high or tall. This prevents blanching by the sun as the majority of the material is below the upper surface. Only the very top of the windrow is affected by the sun's rays. Blanching causes the cut material to turn tan or brown and destroys the vitamin A content in such cuttings.

Actual field tests reveal that vitamin A content is twenty times as great in cuttings obtained with the windrow attachment of the present invention, as compared with the conventional method of cutting and raking. The same tests show that with this attachment the protein content is thirty percent greater.

A unique feature of the invention is that by a few simple changes the mower may be converted between a conventional rotary cutter and one with a windrowing attachment.

These, together with other objects and advantages which will subsequently become apparent reside in the details of construction and operation, as more fully described and claimed hereinafter, reference being had to the accompanying drawings forming a part hereof, wherein like numerals refer to like parts in the various views. In the drawings:

FIG. 1 is a top view of a rotary mower equipped with an attachment in accordance with the invention, portions of the mower housing being broken away for purposes of illustration;

FIG. 2 is a side-elevational view of the mower and attachment;

FIG. 3 is an enlarged sectional view taken along the line 3—3 of FIG. 1 in the direction of the arrows;

FIG. 4 is a sectional view taken along the line 4—4 of FIG. 3; and

FIG. 5 is an exploded perspective view of the windrowing attachment and a portion of the rotary mower.

In the accompanying drawings, there is illustrated a conventional rotary cutter or mower of the type designed to be towed by a farm tractor. It can be hitched to the rear of the tractor (not shown) by means of a tongue or draw bar 40 provided on the front of the mower housing 10, so that the tongue serves to support the forward portion of the housing while the rear portion is carried by trailing ground wheels as described hereinafter.

A drive shaft 12 whose forward end is adapted to be connected to the power take-off of the tractor in the usual fashion serves to transmit power via the universal joint 14 and a conventional motion transfer mechanism 16 to the rotary cutter blade 18 located beneath the deck 20 of the mower housing, thereby to turn the blade in a generally horizontal orbit, the direction of the blade rotation being counterclockwise as seen in FIG. 1.

The trailing ground wheels 26 and 28 which support the rear of the housing are adjustably mounted thereon by means of arms 29 and 30 which are hinged to the housing for up and down swinging movement. More particularly, the respective arms have integral laterally projecting spindles 34 and 35 at their forward ends, these spindles being journaled in bearings 32 secured to the reinforcing frame members 31 and 33 of the deck 20. Wheel adjustment mechanisms 38 and 39, also a conventional part of the mower, are operative to raise and lower the arms as desired, thereby to adjust the elevation or cutting height of blade 18 above the ground.

The mower housing is, of course, entirely open on the bottom so that the cutter blade can mow the standing grass or hay over which the deck 20 passes. It is also essentially open on the front. Around the rest of the margin of deck 20 there is a depending skirt 41, except that this is omitted on one side of the housing to provide a lateral discharge opening 42 for the cut material. As will be described presently, this opening can be closed by a side panel 74 as shown by dotted lines in FIG. 5 if it is desired to mow without collecting the cut material into a windrow, in which case the mower operates in entirely conventional fashion. For windrowing, however, this wall is spaced laterally from the discharge opening (see FIG. 3) and forms a part of the windrowing attachment 46 contemplated by the present invention.

Before describing the latter attachment in detail, it should perhaps be explained that when this is employed the mower also is modified by the addition of a deflector 90 to the underside of deck 20 to aid the discharge of cut material through opening 42. Deflector 90 is a flat plate having along its upper edge mounting brackets 92 which permit the plate to be secured to the deck by bolts 94. The deflector is located rearwardly of the discharge opening when considered with respect to the direction of rotation of blade 18. It is also at an angle to a radial line drawn from the axis of rotation of the blade. The outer end of the deflector is located approximately at the rear edge of discharge opening 42, and the deflector extends inwardly and forwardly with respect to the longitudinal axis of the mower housing.

As previously indicated, it is the purpose of deflector 90 to guide the material cut by rotary blade 18 to and through the discharge opening 42. In this connection it will be understood that the generally circumferential air stream produced in the mower housing by the blade's rotation tends to carry cut material counterclockwise with the blade (FIG. 1). Deflector 90 serves to divert a large part of this air stream, directing it and the airborne material carried by it out of the housing through the discharge opening 42.

Referring now to FIG. 5, where the windrowing attachment 46 is shown separated from the mower housing 10 for clarity, this attachment includes a generally rectangular top plate or wall 70 having frame members 50, 52, 65 and 68 secured thereto by welding or otherwise to form a rigid unitary assembly. As will be seen, frame member 68 extends along one longitudinal edge of the top plate, while transverse members 50 and 52 extend from member 68 along the forward and rear edges of the plate, being of such length that they project beyond the opposite longitudinal edge of the top plate. Member 65 is a reinforcing rib disposed diagonally of the plate from corner to corner.

The projecting portions of frame members 50 and 52 comprise supports by means of which the attachment is adapted to be mounted on mower housing 10. For this purpose, member 50 is provided with holes 60 and 61 which register with corresponding holes in frame member 57 and deck 20 when member 50 is placed on the deck as shown in FIG. 1; bolts 54 and 56 extending through these holes thus can be employed to secure it in place. Similarly, member 52 is provided with holes 64 which register with corresponding holes in an upstanding flange on frame member 33 of the mower housing, bolts 63 being employed to secure it in place. When thus positioned, top plate 70 of the attachment is substantially flush with deck 20 and extends outwardly therefrom over the discharge opening 42.

Windrowing attachment 46 also has a vertical side wall or baffle 73 detachably secured to the longitudinal frame member 68 so that it extends downwardly therefrom at the outermost edge of top plate 70. This side wall comprises a flat panel 74 with a plurality of upright braces 75 secured thereto, the latter projecting above the upper edge of the panel and having holes 76 through which they are secured by bolts 77 to the frame member 68. Along the lower edge of panel 74 there is a structural member 78 with an upwardly inclined front portion 79, this serving as a ground engaging shoe or skid to stabilize the attachment as it is used in a rough field.

Together, the top plate 70 and the side panel 74 form a generally tunnel-like chamber 97 beside the mower housing, this being open at the front and at the rear. Associated with the rear opening, however, are a pair of swingably depending doors or gates 82 and 84 which hang from a horizontal hinge pin 85 located adjacent to the trailing edge of plate 70, the hinge pin being supported at its ends by brackets 86 on the frame member 52.

As will be evident, cut material discharged from the mower housing 10 through opening 42 enters the windrow forming chamber 97 at the side of the housing. This material is discharged in a lateral and rearward direction under the influence of rotary blade 18 and deflector 90, a considerable amount of it being airborne as previously mentioned.

Its path is blocked by baffle 74 on the side and by gates 82 and 84 on the rear, so that the material falls to the ground within chamber 97 forming a windrow over the top of which gates 82 and 84 can ride by swinging rearwardly. Stated differently, the gates are effective to generally close off the gap which otherwise would exist above the windrow where it passes through the windrow exit opening 81 at the rear of chamber 97; thus they serve as a barrier to prevent cut material from escaping through this gap and scattering over a wide area, whereby the material is collected in a tall, neat windrow of uniform comparatively narrow width.

In order to remove the windrowing attachment, it is only necessary to remove bolts 54, 56 and 63. By removing bolts 77, the side panel 74 can be detached from frame member 68 and attached in similar fashion to frame member 88 of the mower housing thereby to close the discharge opening 42. When this is done, deflector 90 also is removed, thereby restoring the mower to its original condition for the purpose of mowing in conventional fashion, that is to say without collecting the cut material into a windrow.

From the foregoing it will be seen that this invention is one well adapted to attain all of the ends and objects hereinbefore set forth, together with other advantages which are obvious and which are inherent to the structure.

Since various modifications of the invention will be apparent to those skilled in the art, it should be understood that all matter herein set forth or showing in the accompanying drawings is intended to be illustrative only, and that all suitable modifications and equivalents as fall within the scope of the appended claims may be employed without departing from the invention.

I claim:
1. A power mower of the rotating blade type having a housing including a top and a depending peripheral side, said side having a discharge opening therein, material directing means associated with said discharge opening, a second housing extending laterally from said opening and having a top and a depending side opposite said opening, and at least one barrier means mounted on said lateral housing and located between the discharge end of said depending side of said second housing and the adjacent portion of said depending peripheral side of the mower housing.

2. A power mower as set forth in claim 1 further characterized in that said barrier means includes a plurality of elements depending from said lateral housing.

3. A power mower as set forth in claim 2 further characterized in that said elements are swingably supported on said lateral housing.

References Cited in the file of this patent
UNITED STATES PATENTS

| | | |
|---|---|---|
| 2,708,334 | Coners | May 17, 1955 |
| 2,730,374 | Rogers et al. | Jan. 10, 1956 |
| 2,756,556 | Watkins | July 31, 1956 |
| 2,877,616 | Gewalt et al. | Mar. 17, 1959 |
| 2,891,369 | Rietz | June 23, 1959 |